J. D. JONES.
AXLE BOX AND DUST GUARD.
APPLICATION FILED MAR. 29, 1909.
947,105.
Patented Jan. 18, 1910.
2 SHEETS—SHEET 1.
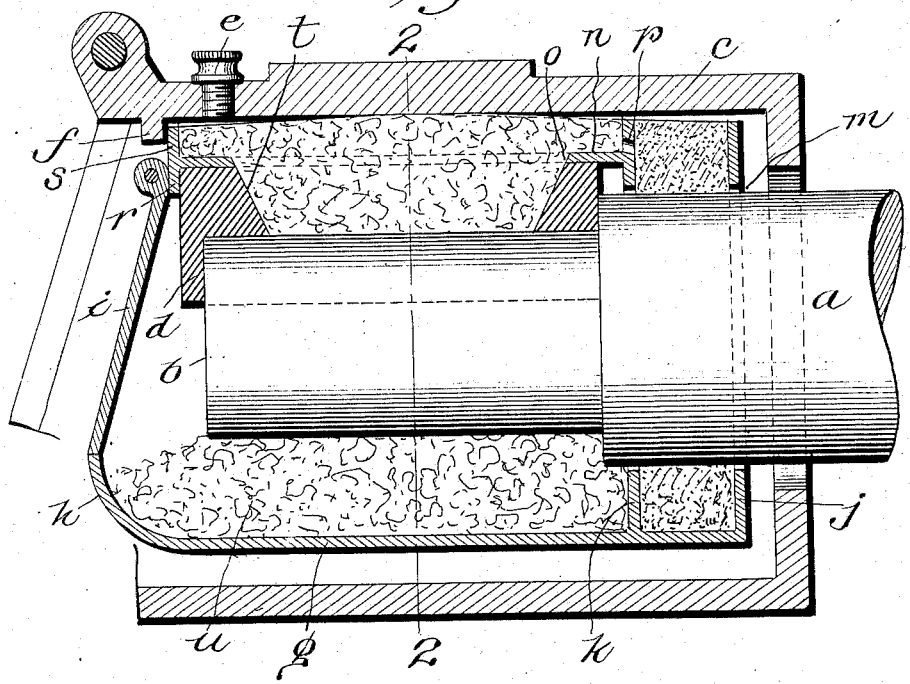
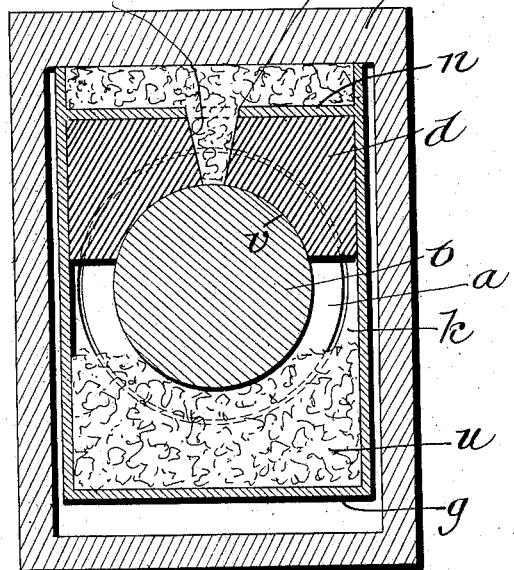
Witnesses
Geo. A. Bepull
A. W. Neale, Jr.
Inventor
John D. Jones,
By Wilkinson, Fisher & Witherspoon
Attorneys

J. D. JONES.
AXLE BOX AND DUST GUARD.
APPLICATION FILED MAR. 29, 1909.

947,105.

Patented Jan. 18, 1910.
2 SHEETS—SHEET 2.

Witnesses
Geo. A. Bepner.
A. W. Neale, Jr.

Inventor
John D. Jones,
By Wilkinson, Fisher & Witherspoon
Attorneys.

UNITED STATES PATENT OFFICE.

JOHN D. JONES, OF WALLA WALLA, WASHINGTON, ASSIGNOR OF ONE-HALF TO H. P. HOWARD, OF FORT WALLA WALLA, WASHINGTON.

AXLE-BOX AND DUST-GUARD.

947,105.   Specification of Letters Patent.   Patented Jan. 18, 1910.

Application filed March 29, 1909. Serial No. 486,497.   REISSUED

*To all whom it may concern:*

Be it known that I, JOHN D. JONES, a citizen of the United States, residing at Walla Walla, in the county of Walla Walla and State of Washington, have invented certain new and useful Improvements in Axle-Boxes and Dust-Guards; and I do hereby declare the following to be a full, clear, and exact description of the invention, such as will enable others skilled in the art to which it appertains to make and use the same.

My invention relates to improvements in axle boxes and dust guards and the object of my invention is to provide a device which shall furnish a lubricant directly to the top surface of a car journal, prevent the entrance of dust and dirt into the parts surrounding said journal, provide packing in contact with a car-journal both above and below, economize in the use of lubricant and packing material and in the wear and tear, and prevent the heating of car journals and consequent accidents.

Further objects will be apparent in the description of the invention.

My device is simple in design, inexpensive in construction, devoid of complicated parts, easy of application, and applicable to existing forms and standards of railroad car journals, bearings, axles, and axle boxes.

My invention consists in the novel construction and combinations of parts as hereinafter described and claimed, it being understood that changes in form, proportions, size, materials and minor details may be made without departing from the spirit of, or sacrificing any of the advantages of the invention.

Figure 3:
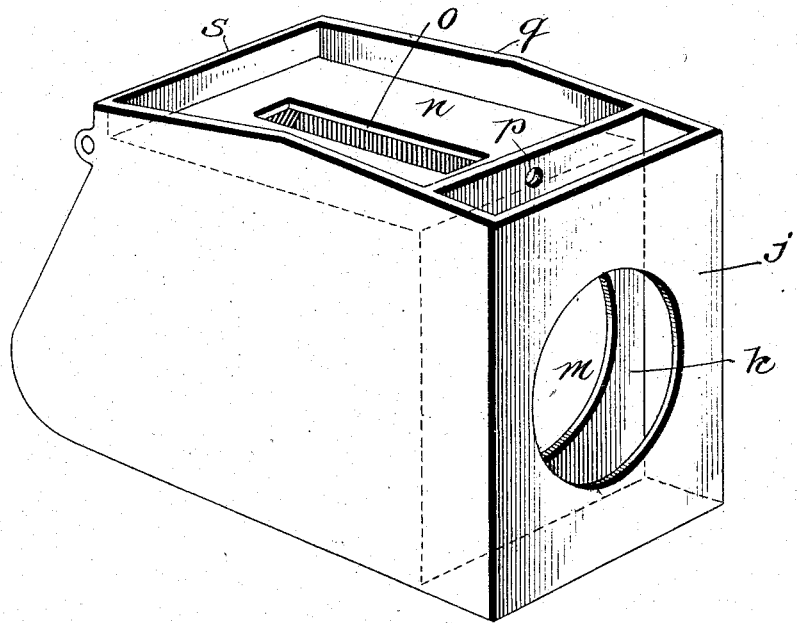
Figure 4:
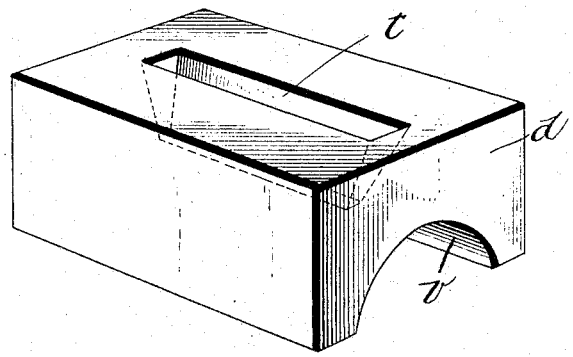

In the accompanying drawings—Figure 1 is a longitudinal section showing my invention as applied to a car axle. Fig. 2 is a cross section of the same on the line 2—2 of Fig. 1. Fig. 3 is a perspective view of the packing box, used inside the axle-box. Fig. 4 is a perspective view of the bearing.

*a* represents a car axle and *b* the journal thereof. *c* represents a railroad car axle-box of the ordinary type, adapted to surround said journal and the end of the axle. *d* represents the bearing. The axle-box *c* is provided with an opening for the application of a lubricant, which is ordinarily closed by a screw cap *e*, or equivalent device. The upper part of the axle-box is provided with a rib or ridge *f* for holding the removable packing box in position. This packing box is shown in perspective in Fig. 3, and in section in Figs. 1 and 2. It consists of a bottom *g*, curved outwardly as shown at *h*, and having an opening in its outer end which is preferably closed by the hinged lid *i*. On the inner part, the packing box is provided with two upright partitions *j* and *k*, perforated as shown at *m*, for the passage of the axle therethrough. The top of the box *n* is provided with a recessed portion, as shown in Fig. 3, and is provided with a wedge-shaped opening *o*.

*p* represents a hole through the upper part of the partition *k*, above the top *n*, so that the lubricant may pass from the outer part of the packing box to the space between the partitions *j* and *k*. The sides of the upper part of the box above the part *n* are inclined, as shown at *q*, meeting in a point. At the outer end the packing box is provided with a downwardly projecting rib *r*, which confines the bearing *d* in position, and the outer part of the box is provided with an upwardly projecting portion *s*, adapted to engage with the rib *f* on the casing. The bearing *d* is provided with a wedge-shaped opening *t*, inclined in two directions as is shown in Figs. 1 and 2, and the lower part thereof is rounded off, as shown at *v*, to fit the journal *b*. The top of the packing box, the opening *t*, the space below the journal *b*, and the spaces above and below the axle *a*, and between the partitions *j* and *k* are packed with any suitable soft, absorbent packing *u*, such as wool.

It should be noticed that the packing-box and bearing may be inserted within or removed from the axle-box without removing the axle-box from the truck-frame of the car. In either case, the axle-box is simply lifted in its place upon the truck-frame until the rib *f* clears the top of the packing-box *s*, when the packing-box and the bearing are removed or inserted together.

In assembling the parts, the bearing is first placed within the packing-box against the rib *r*, then the bearing and packing-box together are inserted within the axle-box and slipped over the end of the journal and axle until the upper portion of the packing-box *s* clears the rib *f*; the axle-box is then lowered into place, leaving the rib $f$ in front of and against the portion $s$ of the packing-box.

By this invention a simple and effective means is provided for supplying lubricant to the top of the axle as well as below, as the oil which is supplied through the top seeps down from above the journal to the space below it, and seeps through the opening $p$ into the space between the partitions $j$ and $k$. This results in the use of a less amount of oil and less packing; it protects in a superior manner the journal and bearing from dust and dirt; it decreases the weight and consequent cost of the brass journal bearing; it saves wear and tear by providing a constant and reliable system of lubrication; it prevents overheating and the consequent delays and accidents, and the dust guard can be readily applied without removing the axle box.

I claim:—

1. The combination of a car axle provided with a journal, an axle-box adapted to surround said journal, said axle-box being provided with an opening for the supply of lubricant, a packing box removably held in said axle-box, and a slotted bearing within said packing box, said axle-box being provided with a downwardly projecting rib for holding the packing box therein, said packing box being provided with a downwardly projecting rib for holding the bearing against the end of the car axle, the top of said box being provided with a wedge-shaped opening, and said box being provided with vertical partitions perforated for the passage of the car axle, one of said partitions being provided with a perforation for the passage therethrough of lubricating material, substantially as described.

2. The combination of a car axle provided with a journal, a bearing adapted to rest on said journal, said bearing being provided with a wedge-shaped opening therethrough, a packing box surrounding said bearing and the end of the car axle, said packing box being provided with a lid, with a downwardly projecting rib for holding said bearing in contact with said axle, with a perforated top, with vertical partitions forming a separate chamber, said partitions being perforated for the passage therethrough of the car axle and one of said partitions being provided with a hole permitting the passage of lubricating material therethrough, the top of said box being provided with an upwardly projecting end, and an axle-box surrounding said packing box and the end of the car axle, said axle-box being provided with an opening for the admission of lubricant, means for closing said opening, and with a downwardly projecting rib for holding said packing box in said axle-box, substantially as described.

In testimony whereof, I affix my signature, in presence of two witnesses.

JOHN D. JONES.

Witnesses:
H. S. JACKSON,
I. G. PAINE.